(12) United States Patent
Sankar et al.

(10) Patent No.: US 9,477,725 B2
(45) Date of Patent: Oct. 25, 2016

(54) SEARCH RESULTS USING DENSITY-BASED MAP TILES

(71) Applicant: Facebook, Inc., Menlo Park, CA (US)

(72) Inventors: Sriram Sankar, Palo Alto, CA (US); Stanislav Basovnik, Mountain View, CA (US)

(73) Assignee: Facebook, Inc., Menlo Park, CA (US)

( * ) Notice: Subject to any disclaimer, the term of this patent is extended or adjusted under 35 U.S.C. 154(b) by 9 days.

(21) Appl. No.: 14/538,566

(22) Filed: Nov. 11, 2014

(65) Prior Publication Data

US 2015/0066914 A1    Mar. 5, 2015

Related U.S. Application Data

(63) Continuation of application No. 13/685,246, filed on Nov. 26, 2012, now Pat. No. 8,914,393.

(51) Int. Cl.
*G06F 17/30* (2006.01)
*H04L 12/18* (2006.01)

(52) U.S. Cl.
CPC ..... *G06F 17/30554* (2013.01); *G06F 17/3087* (2013.01); *G06F 17/30241* (2013.01); *G06F 17/30864* (2013.01); *H04L 12/1813* (2013.01); *G06F 17/30867* (2013.01)

(58) Field of Classification Search
CPC ............... G06F 17/30241; G06F 17/30864; G06F 17/30867; G06F 17/30067; G06Q 30/02
USPC .................................. 707/758, 769
See application file for complete search history.

(56) References Cited

U.S. PATENT DOCUMENTS

| | | | | |
|---|---|---|---|---|
| 2010/0125562 A1* | 5/2010 | Nair | ............ | G06F 17/3089 707/709 |
| 2010/0197318 A1* | 8/2010 | Petersen | ............ | G06Q 10/10 455/456.1 |
| 2013/0097163 A1* | 4/2013 | Oikarinen | ............ | G06F 17/30241 707/736 |

* cited by examiner

*Primary Examiner* — Thu-Nguyet Le
(74) *Attorney, Agent, or Firm* — Baker Botts L.L.P.

(57) ABSTRACT

In one embodiment, a method includes accessing a map comprising a plurality of tiles representing a plurality of geographic areas, respectively, where each tile comprises a plurality of objects having locations within the tile, and each tile has below a threshold number of objects located within the tile; receiving a first query from a first user that includes a first location within a first tile; identifying one or more objects corresponding to the first query, where each identified object has a location within the first tile; and generating search results comprising references to one or more of the identified objects.

19 Claims, 6 Drawing Sheets

SEARCH RESULTS USING DENSITY-BASED MAP TILES

PRIORITY

This application is a continuation under 35 U.S.C. §120 of U.S. patent application Ser. No. 13/685,246, filed 26 Nov. 2012.

TECHNICAL FIELD

This disclosure generally relates to search engines and performing searches for objects.

BACKGROUND

Search engines have become popular tools to identify and locate specific information on the Internet. A search engine is a computer program that, when queried for information, retrieves either related information or pointers to the location of related information, or both, by evaluating content stored in its search database. A key metric in evaluating the performance of search engines is relevance of the search results. Search engine developers are always striving to deliver search results that are relevant to the search query being processed. Consistent with this goal, there have been attempts to rank search results based on a number of different factors. One of the more popular ways to rank search results involves analyzing the position and frequency of keywords on a webpage. Another frequently used technique is analyzing how webpages link to each other.

A social-networking system, which may include a social-networking website, may enable its users (such as persons or organizations) to interact with it and with each other through it. The social-networking system may, with input from a user, create and store in the social-networking system a user profile associated with the user. The user profile may include demographic information, communication-channel information, and information on personal interests of the user. The social-networking system may also, with input from a user, create and store a record of relationships of the user with other users of the social-networking system, as well as provide services (e.g. wall posts, photo-sharing, event organization, messaging, games, or advertisements) to facilitate social interaction between or among users.

SUMMARY OF PARTICULAR EMBODIMENTS

In particular embodiments, in response to a search query from a mobile computing device of a user, a search engine may use a density-based tile map and location information associate with the user to help generate customized search results for the user. For example, a user may transmit a search query to the search engine, along with location information that indicates the user is located within a particular tile of a tile map. Using this information, the search engine may generate search results that are relevant to the location of the user. For example, the search engine may generate search results referencing objects that are located within the user's current tile. The search engine may also expand its search to include references to objects located in neighboring tiles or the parent tile of the user's current tile. Objects that have locations that are closer to the user (i.e., in the user's current tile) may be determined to be more relevant to the user, and thus ranked more highly in the search results that are generated for the user compared to more distant objects (i.e., neighboring tiles or parent tiles at higher levels in the tile map).

DESCRIPTION OF EXAMPLE EMBODIMENTS

Figure 1:
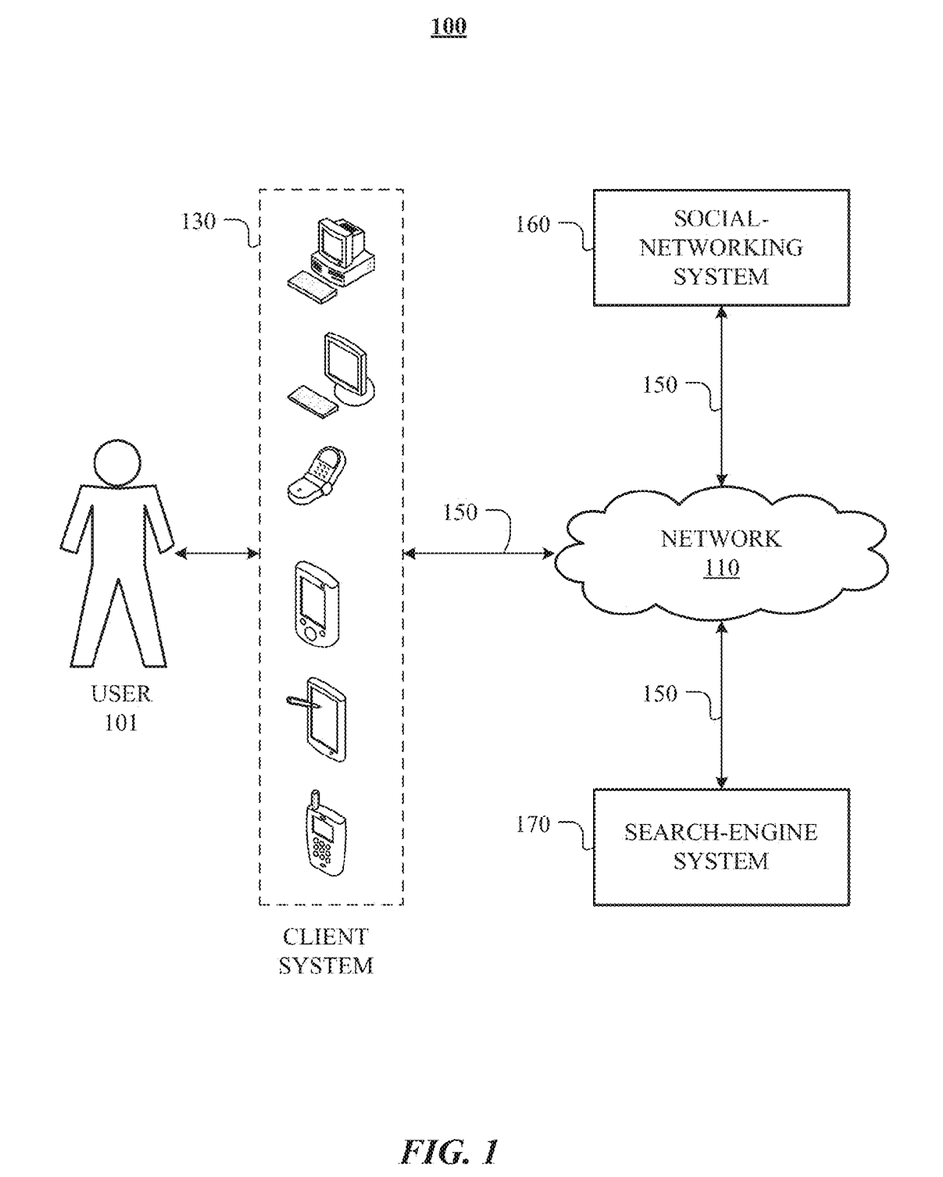
FIG. 1 illustrates an example network environment associated with a social-networking system.

FIG. 1 illustrates an example network environment 100 associated with a social-networking system. Network environment 100 includes a user 101, a client system 130, a social-networking system 160, and a search-engine system 170 connected to each other by a network 110. Although FIG. 1 illustrates a particular arrangement of user 101, client system 130, social-networking system 160, search-engine system 170, and network 110, this disclosure contemplates any suitable arrangement of user 101, client system 130, social-networking system 160, search-engine system 170, and network 110. As an example and not by way of limitation, two or more of client system 130, social-networking system 160, and search-engine system 170 may be connected to each other directly, bypassing network 110. As another example and not by way of limitation, two or more of client system 130, social-networking system 160, and search-engine system 170 may be physically or logically co-located with each other in whole or in part. Thus, social-networking system 160 may be a sub-system of search-engine system 170, or vice versa. Moreover, although FIG. 1 illustrates a particular number of users 101, client systems 130, social-networking systems 160, search-engine systems 170, and networks 110, this disclosure contemplates any suitable number of users 101, client systems 130, social-networking systems 160, search-engine systems 170, and networks 110. As an example and not by way of limitation, network environment 100 may include multiple users 101, client system 130, social-networking systems 160, search-engine systems 170, and networks 110.

In particular embodiments, user 101 may be an individual (human user), an entity (e.g. an enterprise, business, or third-party application), or a group (e.g. of individuals or entities) that interacts or communicates with or over social-networking system 160. In particular embodiments, social-networking system 160 may be a network-addressable computing system hosting an online social network. Social-networking system 160 may generate, store, receive, and send social-networking data, such as, for example, user-profile data, concept-profile data, social-graph information, or other suitable data related to the online social network. Social-networking system 160 may be accessed by the other components of network environment 100 either directly or via network 110. In particular embodiments, social-networking system 160 may include an authorization server that allows users 101 to opt in or opt out of having their actions logged by social-networking system 160 or shared with other systems (e.g. search-engine systems 170), such as, for example, by setting appropriate privacy settings. In particular embodiments, search-engine system 170 may be a network-addressable computing system that can host an online search engine. Search-engine system 170 may generate, store, receive, and send search-related data, such as, for example, search queries, search results, and other suitable search-related data. As an example and not by way of limitation, search-engine system 170 may implement one or more search algorithms to identify network resources in response to search queries received at search-engine system 170, one or more scoring algorithms or ranking algorithms to score and/or rank identified network resources, or one or more summarization algorithms to summarize identified network resources. In particular embodiments, a scoring algorithm implemented by search-engine system 170 may use a machine-learned scoring formula, which the scoring algorithm may obtain automatically from a set of training data constructed from pairs of search queries and selected Uniform Resource Locators (URLs), where appropriate. Search-engine system 170 may be accessed by the other components of network environment 100 either directly or via network 110. In particular embodiments, one or more users 101 may use one or more client systems 130 to access, send data to, and receive data from social-networking system 160 or search-engine system 170. Client system 130 may access social-networking system 160 or search-engine system 170 directly, via network 110, or via a third-party system. As an example and not by way of limitation, client system 130 may access search-engine system 170 via social-networking system 160. Client system 130 may be any suitable computing device, such as, for example, a personal computer, a laptop computer, a cellular telephone, a smartphone, or a tablet computer.

This disclosure contemplates any suitable network 110. As an example and not by way of limitation, one or more portions of network 110 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. Network 110 may include one or more networks 110.

Links 150 may connect client system 130, social-networking system 160, and search-engine system 170 to communication network 110 or to each other. This disclosure contemplates any suitable links 150. In particular embodiments, one or more links 150 include one or more wireline (such as for example Digital Subscriber Line (DSL) or Data Over Cable Service Interface Specification (DOCSIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links. In particular embodiments, one or more links 150 each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link 150, or a combination of two or more such links 150. Links 150 need not necessarily be the same throughout network environment 100. One or more first links 150 may differ in one or more respects from one or more second links 150.

Figure 2:
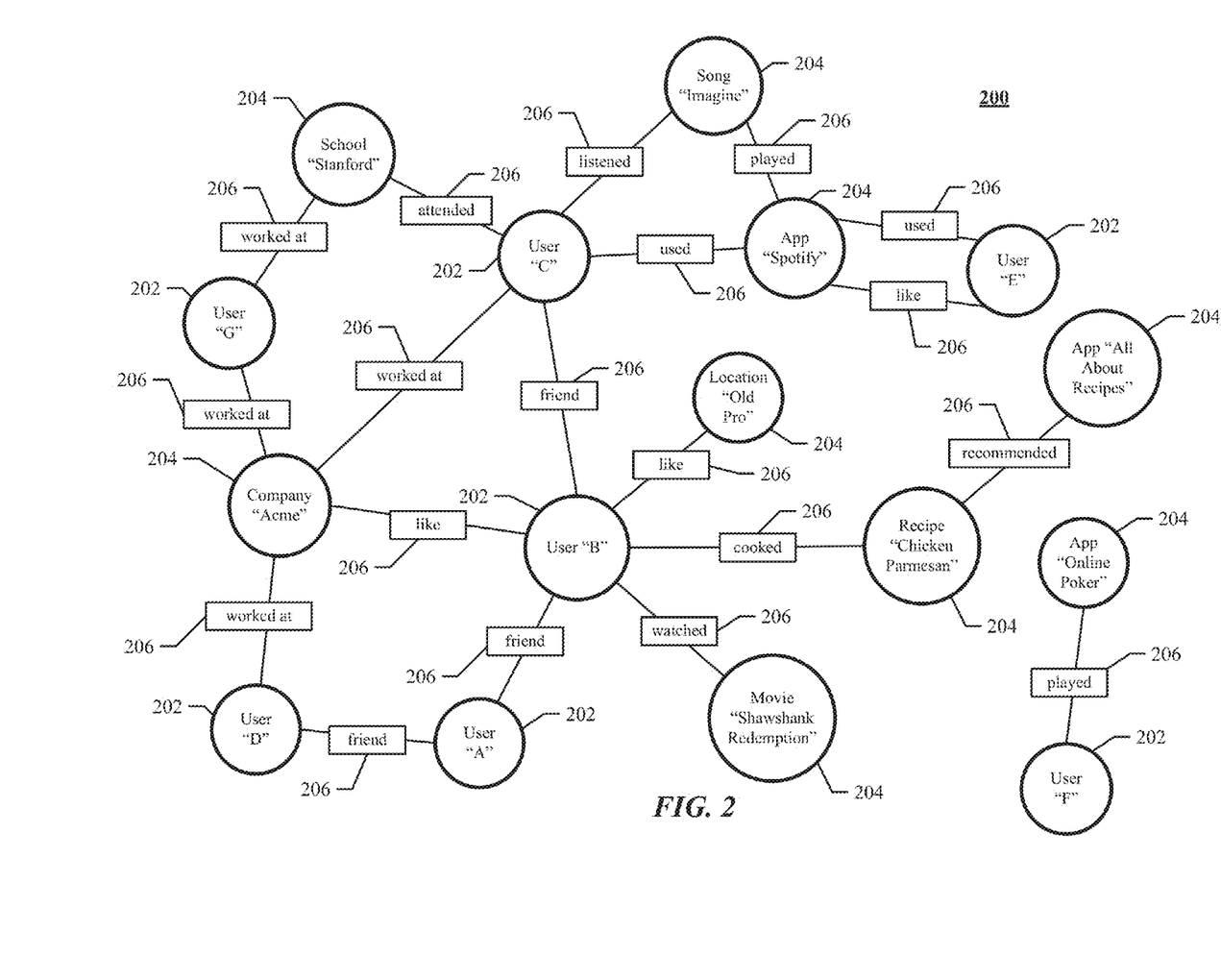
FIG. 2 illustrates an example social graph.

FIG. 2 illustrates example social graph 200. In particular embodiments, social-networking system 160 may store one or more social graphs 200 in one or more data stores. In particular embodiments, social graph 200 may include multiple nodes—which may include multiple user nodes 202 or multiple concept nodes 204—and multiple edges 206 connecting the nodes. Example social graph 200 illustrated in FIG. 2 is shown, for didactic purposes, in a two-dimensional visual map representation. In particular embodiments, a social-networking system 160, client system 130, or search-engine system 170 may access social graph 200 and related social-graph information for suitable applications. The nodes and edges of social graph 200 may be stored as data objects, for example, in a data store (such as a social-graph database). Such a data store may include one or more searchable or queryable indexes of nodes or edges of social graph 200.

In particular embodiments, a user node 202 may correspond to a user of social-networking system 160. As an example and not by way of limitation, a user may be an individual (human user), an entity (e.g. an enterprise, business, or third-party application), or a group (e.g. of individuals or entities) that interacts or communicates with or over social-networking system 160. In particular embodiments, when a user registers for an account with social-networking system 160, social-networking system 160 may create a user node 202 corresponding to the user, and store the user node 202 in one or more data stores. Users and user nodes 202 described herein may, where appropriate, refer to registered users and user nodes 202 associated with registered users. In addition or as an alternative, users and user nodes 202 described herein may, where appropriate, refer to users that have not registered with social-networking system 160. In particular embodiments, a user node 202 may be associated with information provided by a user or information gathered by various systems, including social-networking system 160. As an example and not by way of limitation, a user may provide his or her name, profile picture, contact information, birth date, sex, marital status, family status, employment, education background, preferences, interests, or other demographic information. As another example and not by way of limitation, the social-networking system 160 may determine information about a user (e.g., location, interests, etc.) by referencing other information or system that may store or generate such information. In particular embodiments, a user node 202 may be associated with one or more data objects corresponding to information associated with a user. In particular embodiments, a user node 202 may correspond to one or more webpages.

In particular embodiments, a concept node 204 may correspond to a concept. As an example and not by way of limitation, a concept may correspond to a place (such as, for example, a movie theater, restaurant, landmark, or city); a website (such as, for example, a website associated with social-network system 160 or a third-party website associated with a web-application server); an entity (such as, for example, a person, business, group, sports team, or celebrity); a resource (such as, for example, an audio file, video file, digital photo, text file, structured document, or application) which may be located within social-networking system 160 or on an external server, such as a web-application server; real or intellectual property (such as, for example, a sculpture, painting, movie, game, song, idea, photograph, or written work); a game; an activity; an idea or theory; another suitable concept; or two or more such concepts. A concept node 204 may be associated with information of a concept provided by a user or information gathered by various systems, including social-networking system 160. As an example and not by way of limitation, information of a concept may include a name or a title; one or more images (e.g. an image of the cover page of a book); a location (e.g. an address or a geographical location); a website (which may be associated with a URL); contact information (e.g. a phone number or an email address); other suitable concept information; or any suitable combination of such information. In particular embodiments, a concept node 204 may be associated with one or more data objects corresponding to information associated with concept node 204. In particular embodiments, a concept node 204 may correspond to one or more webpages.

In particular embodiments, a node in social graph 200 may represent or be represented by a webpage (which may be referred to as a "profile page"). Profile pages may be hosted by or accessible to social-networking system 160. Profile pages may also be hosted on third-party websites associated with a third-party server. As an example and not by way of limitation, a profile page corresponding to a particular external webpage may be the particular external webpage and the profile page may correspond to a particular concept node 204. Profile pages may be viewable by all or a selected subset of other users. As an example and not by way of limitation, a user node 202 may have a corresponding user-profile page in which the corresponding user may add content, make declarations, or otherwise express himself or herself. As another example and not by way of limitation, a concept node 204 may have a corresponding concept-profile page in which one or more users may add content, make declarations, or express themselves, particularly in relation to the concept corresponding to concept node 204.

In particular embodiments, a concept node 204 may represent a third-party webpage or resource hosted by a third-party system. The third-party webpage or resource may include, among other elements, content, a selectable or other icon, or other inter-actable object (which may be implemented, for example, in JavaScript, AJAX, or PHP codes) representing an action or activity. As an example and not by way of limitation, a third-party webpage may include a selectable icon such as "like," "check in," "eat," "recommend," or another suitable action or activity. A user viewing the third-party webpage may perform an action by selecting one of the icons (e.g. "eat"), causing a client system 130 to send to social-networking system 160 a message indicating the user's action. In response to the message, social-networking system 160 may create an edge (e.g. an "eat" edge) between a user node 202 corresponding to the user and a concept node 204 corresponding to the third-party webpage or resource and store edge 206 in one or more data stores.

In particular embodiments, a pair of nodes in social graph 200 may be connected to each other by one or more edges 206. An edge 206 connecting a pair of nodes may represent a relationship between the pair of nodes. In particular embodiments, an edge 206 may include or represent one or more data objects or attributes corresponding to the relationship between a pair of nodes. As an example and not by way of limitation, a first user may indicate that a second user is a "friend" of the first user. In response to this indication, social-networking system 160 may send a "friend request" to the second user. If the second user confirms the "friend request," social-networking system 160 may create an edge 206 connecting the first user's user node 202 to the second user's user node 202 in social graph 200 and store edge 206 as social-graph information in one or more of data stores 24. In the example of FIG. 2, social graph 200 includes an edge 206 indicating a friend relation between user nodes 202 of user "A" and user "B" and an edge indicating a friend relation between user nodes 202 of user "C" and user "B." Although this disclosure describes or illustrates particular edges 206 with particular attributes connecting particular user nodes 202, this disclosure contemplates any suitable edges 206 with any suitable attributes connecting user nodes 202. As an example and not by way of limitation, an edge 206 may represent a friendship, family relationship, business or employment relationship, fan relationship, follower relationship, visitor relationship, subscriber relationship, superior/subordinate relationship, reciprocal relationship, non-reciprocal relationship, another suitable type of relationship, or two or more such relationships. Moreover, although this disclosure generally describes nodes as being connected, this disclosure also describes users or concepts as being connected. Herein, references to users or concepts being connected may, where appropriate, refer to the nodes corresponding to those users or concepts being connected in social graph 200 by one or more edges 206.

In particular embodiments, an edge 206 between a user node 202 and a concept node 204 may represent a particular action or activity performed by a user associated with user node 202 toward a concept associated with a concept node 204. As an example and not by way of limitation, as illustrated in FIG. 2, a user may "like," "attended," "played," "listened," "cooked," "worked at," or "watched" a concept, each of which may correspond to a edge type or subtype. A concept-profile page corresponding to a concept node 204 may include, for example, a selectable "check in" icon (such as, for example, a clickable "check in" icon) or a selectable "add to favorites" icon. Similarly, after a user clicks these icons, social-networking system 160 may create a "favorite" edge or a "check in" edge in response to a user's action corresponding to a respective action. As another example and not by way of limitation, a user (user "C") may listen to a particular song ("Ramble On") using a particular application (SPOTIFY, which is an online music application). In this case, social-networking system 160 may create a "listened" edge 206 and a "used" edge (as illustrated in FIG. 2) between user nodes 202 corresponding to the user and concept nodes 204 corresponding to the song and application to indicate that the user listened to the song and used the application. Moreover, social-networking system 160 may create a "played" edge 206 (as illustrated in FIG. 2) between concept nodes 204 corresponding to the song and the application to indicate that the particular song was played by the particular application. In this case, "played" edge 206 corresponds to an action performed by an external application (SPOTIFY) on an external audio file (the song "Imagine"). Although this disclosure describes particular edges 206 with particular attributes connecting user nodes 202 and concept nodes 204, this disclosure contemplates any suitable edges 206 with any suitable attributes connecting user nodes 202 and concept nodes 204. Moreover, although this disclosure describes edges between a user node 202 and a concept node 204 representing a single relationship, this disclosure contemplates edges between a user node 202 and a concept node 204 representing one or more relationships. As an example and not by way of limitation, an edge 206 may represent both that a user likes and has used at a particular concept. Alternatively, another edge 206 may represent each type of relationship (or multiples of a single relationship) between a user node 202 and a concept node 204 (as illustrated in FIG. 2 between user node 202 for user "E" and concept node 204 for "SPOTIFY").

In particular embodiments, social-networking system 160 may create an edge 206 between a user node 202 and a concept node 204 in social graph 200. As an example and not by way of limitation, a user viewing a concept-profile page (such as, for example, by using a web browser or a special-purpose application hosted by the user's client system 130) may indicate that he or she likes the concept represented by the concept node 204 by clicking or selecting a "Like" icon, which may cause the user's client system 130 to send to social-networking system 160 a message indicating the user's liking of the concept associated with the concept-profile page. In response to the message, social-networking system 160 may create an edge 206 between user node 202 associated with the user and concept node 204, as illustrated by "like" edge 206 between the user and concept node 204. In particular embodiments, social-networking system 160 may store an edge 206 in one or more data stores. In particular embodiments, an edge 206 may be automatically formed by social-networking system 160 in response to a particular user action. As an example and not by way of limitation, if a first user uploads a picture, watches a movie, or listens to a song, an edge 206 may be formed between user node 202 corresponding to the first user and concept nodes 204 corresponding to those concepts. Although this disclosure describes forming particular edges 206 in particular manners, this disclosure contemplates forming any suitable edges 206 in any suitable manner.

In particular embodiments, the social-networking system 160 may determine a geographic location (hereinafter also simply "location") of an object (e.g., a user, a concept, or a client system 130 associated with a user or concept). The location of an object may be identified and stored as a street address (e.g., "1601 Willow Road"), a set of geographic coordinates (latitude and longitude), a reference to another location or object (e.g., "the coffee shop next to the train station"), a reference to a map tile (e.g., "map tile 32"), or using another suitable identifier. In particular embodiments, the location of an object may be provided by a user of an online social network. As an example and not by way of limitation, a user may input his location by checking-in at the location or otherwise providing an indication of his location. As another example and not by way of limitation, a user may input the location of a concept (e.g., a place or venue) by accessing the profile page for the concept and entering the location information (e.g., the stress address) of the concept. In particular embodiment, the location of a client system 130 equipped with cellular, Wi-Fi, GPS, or other suitable capabilities may be identified with geographic-positioning signals. As an example and not by way of limitation, a client system 130 may include one or more sensors that may facilitate geo-location functionalities of the system. Processing of sensor inputs by the client system 130 with one or more sensor devices (for example, processing a GPS sensor signal and displaying in the device's graphical user interface a map of a location corresponding to the GPS sensor signal) may be implemented by a combination of hardware, software, and/or firmware (or device drivers). Geographic-positioning signals may be obtained by cell tower triangulation, Wi-Fi positioning, or GPS positioning. In particular embodiments, a geographic location of an Internet-connected computer can be identified by the computer's IP address. A client system 130 may also have additional functionalities incorporating geographic-location data of the device, such as, for example, providing driving directions, displaying a map of a current location, or providing information of nearby points of interest such as restaurants, gas stations, etc. As an example and not by way of limitation, a web browser application on the client system 130 may access a mapping library (e.g., via a function call) that generates a map containing a GPS location obtained by a device driver interpreting a GPS signal from a GPS sensor, and display the map in the web browser application's graphical user interface. In particular embodiments, the location of a user may be determined from a search history associated with the user. As an example and not by way of limitation, if a particular user has previously queried for objects in a particular location, the social-networking system 160 (or the search-engine system 170) may assume that the user is still at that particular location. Although this disclosure describes determining the location of an object in a particular manner, this disclosure contemplates determining the location of an object in any suitable manner.

In particular embodiments, the social-networking system 160 may determine the velocity of an object. Determining the velocity of objects, and using such velocity information is described in U.S. patent application Ser. No. 13/672,404, filed 8 Nov. 2012, which is incorporated by reference herein.

In particular embodiments, the social-networking system 160 may maintain a database of information relating to locations. The social-networking system 160 may also maintain meta information about particular locations, such as, for example, photos of the location, advertisements, user reviews, comments, "check-in" activity data, "like" activity data, hours of operation, or other suitable information related to the location. In particular embodiments, a location may correspond to a concept node 204 in a social graph 200 (such as, for example, as described previously or as described in U.S. patent application Ser. No. 12/763,171, which is incorporated by reference herein). The social-networking system 160 may allow users to access information regarding a location using a client application (e.g., a web browser or other suitable application) hosted by a client system 130. As an example and not by way of limitation, social-networking system 160 may serve webpages (or other structured documents) to users that request information about a location. In addition to user profile and location information, the system may track or maintain other information about the user. As an example and not by way of limitation, the social-networking system 160 may support geo-social-networking functionality including one or more location-based services that record the user's location. As an example and not by way of limitation, users may access the geo-social-networking system using a special-purpose client application hosted by a client system 130 of the user (or a web- or network-based application using a browser client). The client application may automatically access GPS or other geo-location functions supported by the client system 130 and report the user's current location to the geo-social-networking system. In addition, the client application may support geo-social networking functionality that allows users to "check-in" at various locations and communicate this location to other users. A check-in to a given location may occur when a user is physically located at a location and, using a client system 130, access the geo-social-networking system to register the user's presence at the location. The social-networking system 160 may automatically check-in a user to a location based on the user's current location and past location data (such as, for example, as described in U.S. patent application Ser. No. 13/042,357, which is incorporated by reference herein). In particular embodiments, the social-networking system 160 may allow users to indicate other types of relationships with respect to particular locations, such as "like," "fan," "worked at," "recommended," "attended," or another suitable type of relationship. In particular embodiments, "check-in" information and other relationship information may be represented in the social graph 200 as an edge 206 connecting the user node 202 of the user to the concept node 204 of the location.

Figure 3A:
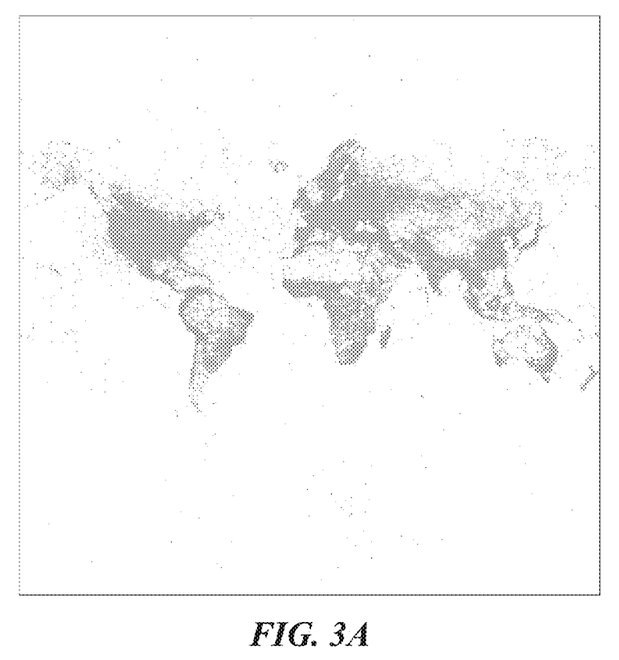
FIGS. 3A and 3B illustrate example maps with map tiles.
Figure 3B:
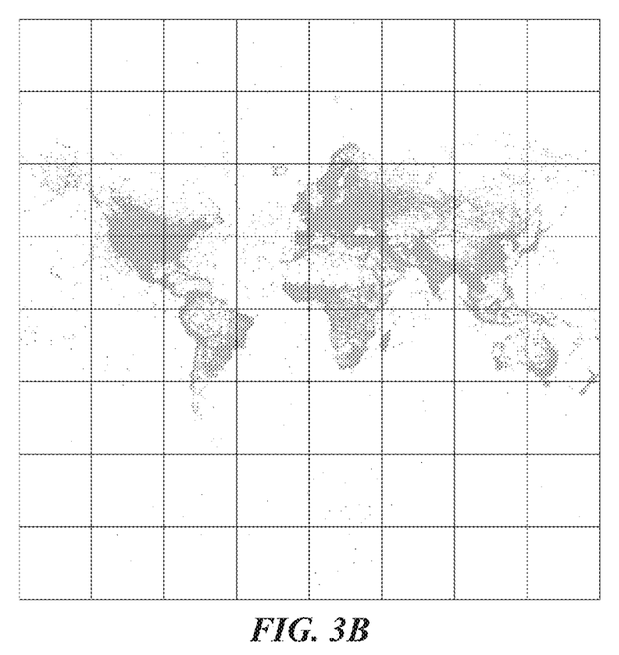

FIGS. 3A and 3B illustrate example maps with map tiles. In particular embodiments, a map may be used to represent a geographic area, such as the world or a portion thereof, a building, or another suitable area. The map may be divided into map tiles (hereinafter simply "tiles"), where each tile represents a particular geographic area of the map. Thus, particular locations may be within particular tiles of a map. As an example and not by way of limitation, a location X may be within a first tile, and locations Y and Z may be within a second tile. In particular embodiments, a tile-based map may be organized in a tree-data structure. A root node in the data structure may correspond to the map, and the child nodes in the data structure may correspond to tiles. The tree-data structure may have tiles organized into a plurality of levels, where the first level corresponds to the root node (i.e., the map), and subsequent levels correspond to subsequent generations of child nodes. In particular embodiments, a map may comprise a plurality of levels of tiles. The tiles at each level may represent different sized portions of the map, with parent nodes representing larger portions of the map than child nodes. In other words, tiles at a higher level will be higher in the tree-data structure (i.e., closer to the root node), while tiles at a lower level with be lower in the tree-data structure. As an example and not by way of limitation, a map may comprise N levels of tiles, which may be labeled levels 1 to N. Level 1 may comprise a single tile representing the map (e.g., the world), corresponding to a root node in the tree-data structure. This is illustrated in FIG. 3A, where a single tile represents the map. Level 2 may comprise four tiles, each representing one quadrant of the map. Each of these tiles may be named (e.g., tiles 1, 2, 3, and 4), and may correspond to a child node in the tree-data structure, with each child node being connected to the root node. Level 3 may comprise sixteen tiles, where each tile from level 2 is divided into quadrants to form four additional tiles at level 3. As before, each of these tiles at level 3 may correspond to a child node in the tree-data structure, which each of these child nodes being connected to a node corresponding to a tile at level 2. FIG. 3B illustrates an example map of level 4, which comprises sixty-four tiles, where each tile from level 3 has been divided into quadrant to form four additional tiles at level 4. This process of dividing a tile at one level to define smaller tiles at a subsequent level may be repeated through level N. Leaf nodes in the tree-data structure will correspond to tiles that are not sub-divided further. Thus, continuing with the previous example, the tiles at level N would correspond to the leaf nodes in the tree-data structure representing the tiles. Similarly, a child node corresponding to a first tile at level m will be connected in the tree-data structure to the parent node corresponding to a second tile at level m−1, where the first tile is located within the second tile. Although this disclosure describes dividing tiles in a level in a particular way to form additional tiles, this disclosure contemplates dividing tiles in any suitable way to form additional tiles. Moreover, although this disclosure describes and FIGS. 3A and 3B illustrate particular maps with particular tiles, this disclosure contemplates any suitable maps having any suitable tiles.

In particular embodiments, a tile in a map may comprise one or more objects having locations within the tile. Where a tile represents a particular geographic area, an object having a location within that geographic area may be considered to be within the tile. As an example and not by way of limitation, FIG. 3A illustrates an example map of objects plotted on a map of the world. Each dot illustrated in FIG. 3A represents a single object plotted on a map of the world. Some regions of the map have numerous objects, while other regions of the map have relatively few or no objects. FIG. 3B then shows the same objects plotted on a map that has been divided into a plurality of tiles. Some tiles have numerous objects, while other tiles have relatively few or no objects. In particular embodiments, an object having a location within a particular tile may be considered associated with the tile. These objects may also be represented in the tree-data structure corresponding to the map tiles, where each object may correspond to a sub-leaf node that is connected to the leaf node representing the tile containing the object. Although this disclosure describes and FIGS. 3A and 3B illustrate particular maps with particular objects located within the maps, this disclosure contemplates any suitable maps having any suitable objected located within the maps.

In particular embodiments, a map may comprise a plurality of tiles, and each tile may have below a threshold number of objects within the tile. As an example and not by way of limitation, a map may be divided into a plurality of tiles where each tiles has an approximately constant object density (i.e., number of objects/tile). As another example and not by way of limitation, a map may be divided into a plurality of tiles where no tile has over a threshold object density (e.g., 1000 objects/tile). In particular embodiments, the plurality of tiles may comprise tiles of a plurality of sizes. Tiles may be sized based on their object density, such that geographic areas with a low number of objects may be represented by larger tiles, while geographic areas with a high number of objects may be represented by smaller tiles. As an example and not by way of limitation, a map comprising N levels of tiles may have a single tile at level 1 representing the map of the world, as illustrated in FIG. 3A. This level 1 tile may be divided into a plurality of level 2 tiles, where each level 2 tile has a particular number of objects. The object density of each of the tiles at level 2 may then be calculated. Each level 2 tile having a number of objects greater than or equal to a threshold number of objects may then be divided into a plurality of level 3 tiles. However, level 2 tiles that are already under the threshold object density, and thus have below the threshold number of objects, may not necessarily be further divided. Consequently, in this example some level 2 tiles may correspond to leaf nodes in the tree-data structure (and thus have no child nodes connected to them), while other level 2 tiles may correspond to nodes that are connected to child nodes corresponding to level 3 tiles. This process may be repeated for each level m for levels 1 to N−1. For each tile at level m, the number of objects within the tile can be calculated, and if the number of objects is greater than or equal to the threshold number of objects, then one or more tiles at level m+1 may be generated within the tile at level m (along with corresponding nodes in the tree-data structure). Similarly, if the tile at level m has less than the threshold number of objects, then it will not be sub-divided, and the node corresponding to that tile in the tree-data structure will become a leaf node. This process may be repeated until all tiles in the map have below the threshold number of objects. Although this disclosure describes generating particular map tiles based on object density in a particular manner, this disclosure contemplates generating any suitable map tiles based on object density in any suitable manner.

Figure 4A:
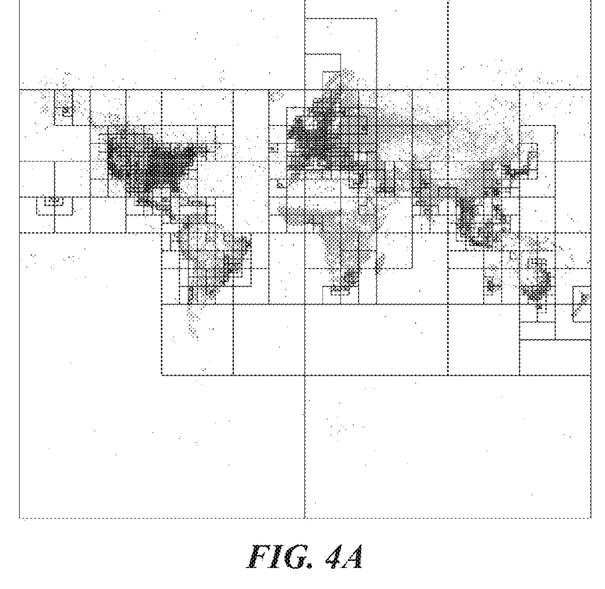
FIGS. 4A and 4B illustrate example maps with density-based map tiles.
Figure 4B:
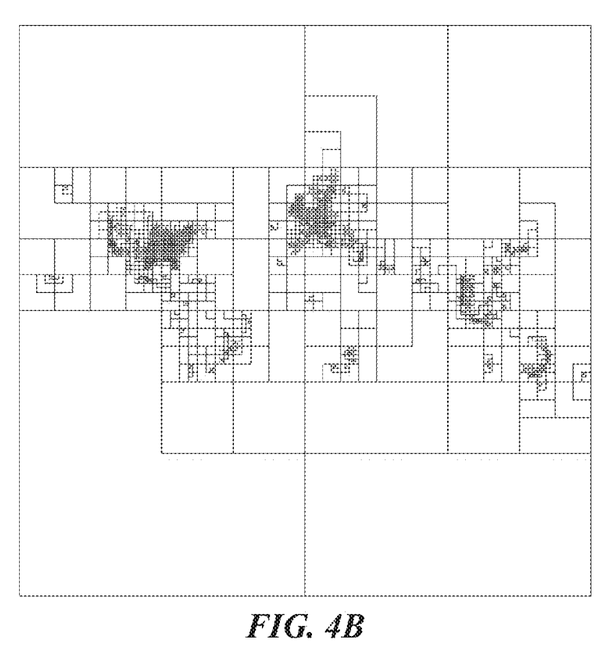

FIGS. 4A and 4B illustrate example maps with density-based map tiles. As an example and not by way of limitation, FIG. 4A illustrates a map comprising a plurality of tiles of a plurality of sizes. Using the map from FIG. 3A, tiles have been generated using the process described previously, by dividing and sub-dividing tiles at subsequent tile levels until all tiles on the map have an object density below a threshold object density. The tile map illustrated in FIG. 4B shows the same tile map as illustrate in FIG. 4A, but the dots that were plotted to show the locations of each object from FIG. 4A has been removed for clarity. Although this disclosure describes and FIGS. 4A and 4B illustrate particular density-based tile maps, this disclosure contemplates generating any suitable density-based tile maps.

In particular embodiments, a user of a client system 130 may search for information relating to a specific subject matter (e.g., persons, places, content, or resources) by providing a short phrase describing the subject matter, often referred to as a "search query," to a search engine. The search engine may conduct a search based on the query phrase using various search algorithms and generate search results that identify resources (e.g., webpages, content, or other information) that are most likely to be related to the search query. To conduct a search, a user may input or transmit a search query to the search engine, which may be hosted by a search-engine system 170. In response, the search engine may identify one or more resources that are likely to be related to the search query, which may collectively be referred to as a "search result" identified for the search query. The search results may be presented to the user, often in the form of a list of links on search-results webpage, each link being associated with a different webpage that contains some of the identified resources or content. In particular embodiments, each link in the search results may be in the form of a Uniform Resource Locator (URL) that specifies where the corresponding webpage is located and the mechanism for retrieving it. The user may then be able to click on the URL links to view the specific resources contained in the corresponding webpages as he wishes. The resources may be ranked and presented to the user according to their relative degrees of relevance to the search query. The search results may also be ranked and presented to the user according to their relative degree of relevance to the user. In other words, the search results may be personalized for the querying user based on, for example, social-graph information, user information, search or browsing history of the user, or other suitable information related to the user. In particular embodiments, ranking of the resources may be determined by a ranking algorithm implemented by the search engine. As an example and not by way of limitation, resources that are relatively more relevant to the search query or to the user may be ranked higher than the resources that are relatively less relevant to the search query or the user. In particular embodiments, the search engine may limit its search to resources and content on the online social network. However, in particular embodiments, the search engine may also search for resources on other sources, such as third-party systems, the internet or World Wide Web, or other suitable sources.

In particular embodiments, the search-engine system 170 may use a density-based tile map and location information associated with a user when generating search results in response to a search query received from the user. A user with a client system 130 may transmit a search query to the search-engine system 170. The user may be searching for particular objects or types of objects. In particular embodiments, the user may be a user of an online social network, and may be searching for locations or persons represented as social-graph entities on a social graph 200. Additionally, the client system 130 may also transmit location information to the search-engine system 170. The location of the user may be transmitted with the search query, or separately. The user's location may be located with a particular tile of a density-based tile map. In particular embodiments, a user may opt in to this service, which causes the client application to automatically transmit location data of the user to the social-networking system 160 or the search-engine system 170. In this manner, the search-engine system 170 may track the client system 130's location (and thus, the user's location) and provide search results that are customized for the user based on the user's current location. The search-engine system 170 may then identify objects that correspond to the user's search query. The identified objects may then be scored and/or ranked based on their relevance to the query, social-relevance, distance from the user, other suitable factors, or any combination thereof. Objects having locations within the same map tile as the user may be considered more relevant, and thus in order to improve the quality of the generated search results, the search-engine system 170 may generate search results preferentially listing objects located in the same tile as the user. If there are not enough search results available in the user's current tile, then the search-engine system 170 may expand its search to neighboring tiles, or the parent tile associated with the tile the user is in. By initially searching for results in the user's current tile (and possibly neighbor/parent tiles), the search-engine system 170 may improve both the efficiency and quality of the search results generated. This may also enable efficient indexing of search information. Although this disclosure describes generating particular search results based on tile maps and location information a particular manner, this disclosure contemplates generating any suitable search results based on tile maps and location information in any suitable manner.

In particular embodiments, the search-engine system 170 may identify one or more objects corresponding to the query from the client system 130. As described above, the querying user may have a first location in a first tile. Similarly, each object may have a second location (for example, in the first tile or another tile). Note that in the case of certain objects, such as persons, the location of the object may not be fixed. In other words, an object may be mobile, and the location of that object may be determined analogously to the first user, as described previously. As an example and not by way of limitation, the first user may input the query "show me the nearest gas station." The search-engine system 170 may parse this text query (such as, for example, by identifying one or more n-grams and identifying corresponding objects and search filters), and search for gas stations located within the first tile. If the search-engine system 170 is unable to identify a sufficient number of objects within the first tile, then the search-engine system 170 may expand its search to neighboring tiles, or the parent tile of the first tile, and identify objects within those tiles. In particular embodiments, the search-engine system 170 may calculate the distance from the first location to each second location and then identify only those objects having a distance from the first user less than a threshold distance. Thus, objects that are beyond a certain distance may be filtered out of the search results regardless of which tile they are located in. In particular embodiments, the search-engine system 170 may then score each of the identified objects based on their relevance to the query or the user. Although this disclosure describes identifying particular objects corresponding to particular search queries, this disclosure contemplates identifying any suitable objects corresponding to any suitable search queries.

In particular embodiments, the search-engine system 170 may determine a score for each identified object corresponding to the search query based on the distance of the object from the first location (i.e., the location of the querying user or his client system 130). When searching for particular objects or object types, the user may be more interested in locating objects that are closer to the user's current location. Thus, objects that are proximal to the user may be scored more highly than objects that are more distant from the user. Although this disclosure describes determining scores for objects in a particular manner, this disclosure contemplates determining scores for objects in any suitable manner.

In particular embodiments, the search-engine system 170 may determine the score for an identified object based social-graph information corresponding to the object. A particular object may correspond to a social-graph entity, such as, for example, a user node 202 or a concept node 204. Thus, in response to a search query, the search-engine system 170 may access a social graph 200 on the social-networking system 160. The search-engine system 170 may then identify user nodes 202 or concept nodes 204 that correspond to the first query. The search-engine system 170 may then determine a score for the identified objects based on the social-graph information corresponding to those objects. As an example and not by way of limitation, when determining a score, s, for an object that corresponds to a search query, the calculation of the score may also factor in social-graph information. Thus, the score determined for a particular social-graph entity, k, given a particular search query, X, and social-graph information, G, may be calculated as s=(k|X,G). In particular embodiments, the search-engine system 170 may score objects based on the proximity of one or more of the first user's social contacts to the object. As an example and not by way of limitation, the search-engine system 170 may access the social-networking system 160 and a location database containing location data of other users of the social-networking system 160, and identify one or more objects corresponding to the search query from the first user that one or more of the first user's first-degree friends are currently proximate to (e.g., based on check-in data, GPS coordinates, or other location data). The search-engine system 170 may then score objects higher if they are closer to the first user's friends, and score objects lower if they are distant from the first user's friends. As another example and not by way of limitation, the search-engine system 170 may identify one or more social contacts of the first user who are associated with the object, such as, for example, a social contact who had "checked-in" previously to the object, a social contact who has reviewed or commented on the object, or otherwise interacted with the object. The social-engine system 170 may then score objects that are more closely associated with the social contacts of the first user higher than objects that are less associated with the first user's social contacts. In particular embodiments, the score for an identified object may be based on the degree of separation between the user node 202 of the first user and the particular social-graph entity corresponding to the identified object. Objects corresponding to social-graph entities that are closer in the social graph 200 to the querying user (i.e., fewer degrees of separation between the element and the first user's user node 202) may be given higher scores than social-graph entities that are further from the user (i.e., more degrees of separation). Furthermore, objects that have a degree of separation greater than or equal to a threshold degree of separation may be filtered out and not identified by the search-engine system 170. In particular embodiments, the search-engine system 170 may adjust the score for an object based on social proximity between the first user and a social-graph entity corresponding to the object. The search-engine system 170 may assign an affinity score to a first user's social contact based on the relationship between the first user and the contact. As an example and not by way of limitation, the search-engine system 170 may assign an affinity score of 1.0 if a social contact is the first user's immediate family member (e.g., parents, siblings), an affinity score of 0.8 if a social contact is the first user's first-degree friend, an affinity score of 0.7 if a social contact and the first user went to the same college during the same year. A system for measuring user affinity is described more generally in U.S. patent application Ser. No. 11/503,093, which is hereby incorporated by reference. In particular embodiments, the score for an identified object may be based on the number of edges 206 connected to the node corresponding to the node for that object. Objects corresponding to nodes with more connecting edges 206 may be more popular and more likely to be a target of a search query. As an example and not by way of limitation, if the concept node 204 for the city "Stanford, Calif." is only connected by five edges while the concept node 204 for the school "Stanford University" is connected by five-thousand edges, when determining the score for objects corresponding to either of these nodes, the search-engine system 170 may determine that the object referencing the concept node 204 for "Stanford University" has a relatively higher score than an object corresponding to the concept node 204 for "Stanford, Calif." because of the greater number of edges connected to the former concept node 204. Although this disclosure describes determining scores for particular objects based on particular social-graph information in a particular manner, this disclosure contemplates determining scores for any suitable objects based on any suitable social-graph information in any suitable manner.

In particular embodiments, the search-engine system 170 may determine the score for an identified object based on a search history associated with the first user (i.e., the querying user). Objects corresponding to particular webpages or social-graph entities that the first user has previously accessed may be more likely to be the target of the user's query. Similarly, objects having locations that the first user has previously been to may be more likely to be the target of the user's query. Thus, these objects may be given a higher score. As an example and not by way of limitation, if the first user has previously visited a concept-profile page for the "Old Pro" bar, when determining the score for objects in response to a query for "beer," the search-engine system 170 may determine that the webpage corresponding to the bar "Old Pro" has a relatively high score because the querying user has previously accessed the page for the venue. Although this disclosure describes determining scores for particular objects based on particular search history information in a particular manner, this disclosure contemplates determining scores for any suitable objects based on any suitable search history information in any suitable manner.

In particular embodiments, the search-engine system 170 may generate search results comprising references to one or more of the identified objects. The reference may include, for example, a name and/or description of the object, the location of the object and its distance from the user, a link (e.g., URL) to a profile page or other webpage associated with the object, social-graph information related to the object (e.g., degree of separation, relation to other social-graph elements), other information associated with the object, or any combination thereof. In particular embodiments, the search-engine system 170 may only generate search results comprising references to identified objects having a rank greater than a threshold rank. The threshold rank may be set so that a particular number of references are included in the search results. As an example and not by way of limitation, the search-engine system 170 may generate search results comprising references to only the top-N ranking objects. The value of N may be determined manually by the user or set by the search-engine system 170. Additionally, the value of N may be based on the size of available local storage on the user's client system 130, the bandwidth available to transmit the search results to the client system 130, the size of the display screen on the client system 130, or based on other suitable factors. In particular embodiments, the search-engine system 170 may generate a ranked list of objects based on the scores determined for the objects. Objects with better (e.g., higher) scores may be ranked higher than objects with worse (e.g., lower) scores. In particular embodiments, the search-engine system 170 may generate search results where particular fractions of the generated search results have particular geographic proximities to the first user on the tile map. As an example and not by way of limitation, the search-engine system 170 may generate search results where 60% of the search results comprise references to objects located within the first tile (i.e., the current tile of the user), 30% of the search results comprise references to objects located within neighboring tiles of the first tile, and 10% of the search results comprise references to objects located in the parent tile of the first tile. Although this disclosure describes generating particular search results in a particular manner, this disclosure contemplates generating any suitable search results in any suitable manner.

In particular embodiments, the search-engine system 170 may transmit the search results to the client system 130 from which the search query was received (e.g., the querying user's computing device). The search results may be transmitted as a structured document, such as a webpage, an email, or another suitable document. These transmitted search results may then be displayed to the user on the client system 130. As an example and not by way of limitation, the search-engine system 170 may transmit a webpage to the client system 130 that includes a map displaying the location of the user and of various objects referenced in the search results. As another example and not by way of limitation, the search-engine system 170 may transmit a document listing the references to the identified objects, along with other relevant information about the objects. In particular embodiments, the search-engine system 170 may also transmit advertisements or other sponsored content to the client system 130 in response to the search query. The advertisements may be included in as part of the search results, or separately. The advertisements may correspond to one or more of the objects referenced in the search results. Although this disclosure describes transmitting particular search results in a particular manner, this disclosure contemplates transmitting any suitable search results in any suitable manner.

Figure 5:
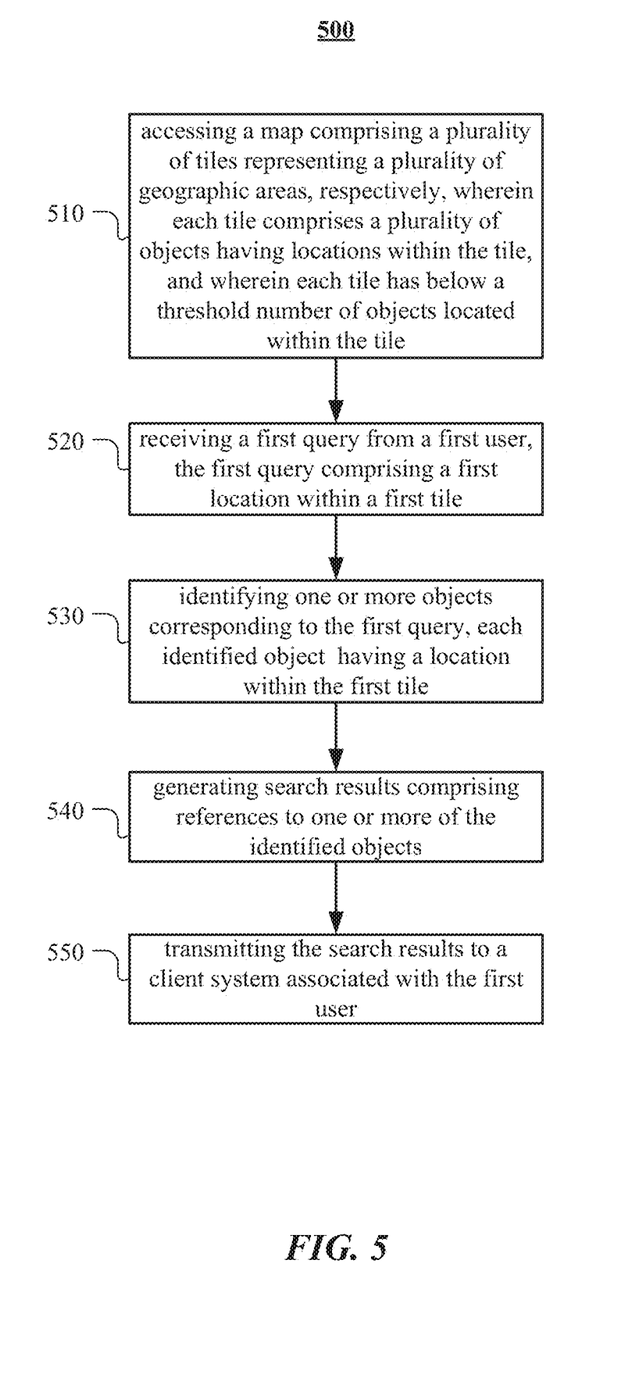
FIG. 5 illustrates an example method for generating search results using density-based map tiles.

FIG. 5 illustrates an example method 500 for generating search results using density-based map tiles. The method may begin at step 510, where the search-engine system 170 may access a map comprising a plurality of tiles representing a plurality of geographic areas, respectively. The tiles may be of a plurality of sizes. Each tile may comprise a plurality of objects having locations with the tile. Furthermore, each tile may have below a threshold number of objects located within the tile. At step 520, the search-engine system 170 may receive a first query from a first user that includes a first location within a first tile. The first location may be the current location of the first user, a client system 130 associated with the first user, or be otherwise determined as described previously. At step 530, the search-engine system 170 may identify one or more objects corresponding to the first query. Each identified object may have a second location that is within the first tile. Also, as described previously, the identified objects may have locations that are within neighboring tiles or parent tiles of the first tile. At step 540, the search-engine system 170 may generate search results comprising references to one or more of the identified objects having locations within the first tile. At step 550, the search-engine system 170 may transmit the search results to a client system 130 of the first user. Particular embodiments may repeat one or more steps of the method of FIG. 5, where appropriate. Although this disclosure describes and illustrates particular steps of the method of FIG. 5 as occurring in a particular order, this disclosure contemplates any suitable steps of the method of FIG. 5 occurring in any suitable order. Moreover, although this disclosure describes and illustrates particular components, devices, or systems carrying out particular steps of the method of FIG. 5, this disclosure contemplates any suitable combination of any suitable components, devices, or systems carrying out any suitable steps of the method of FIG. 5.

Figure 6:
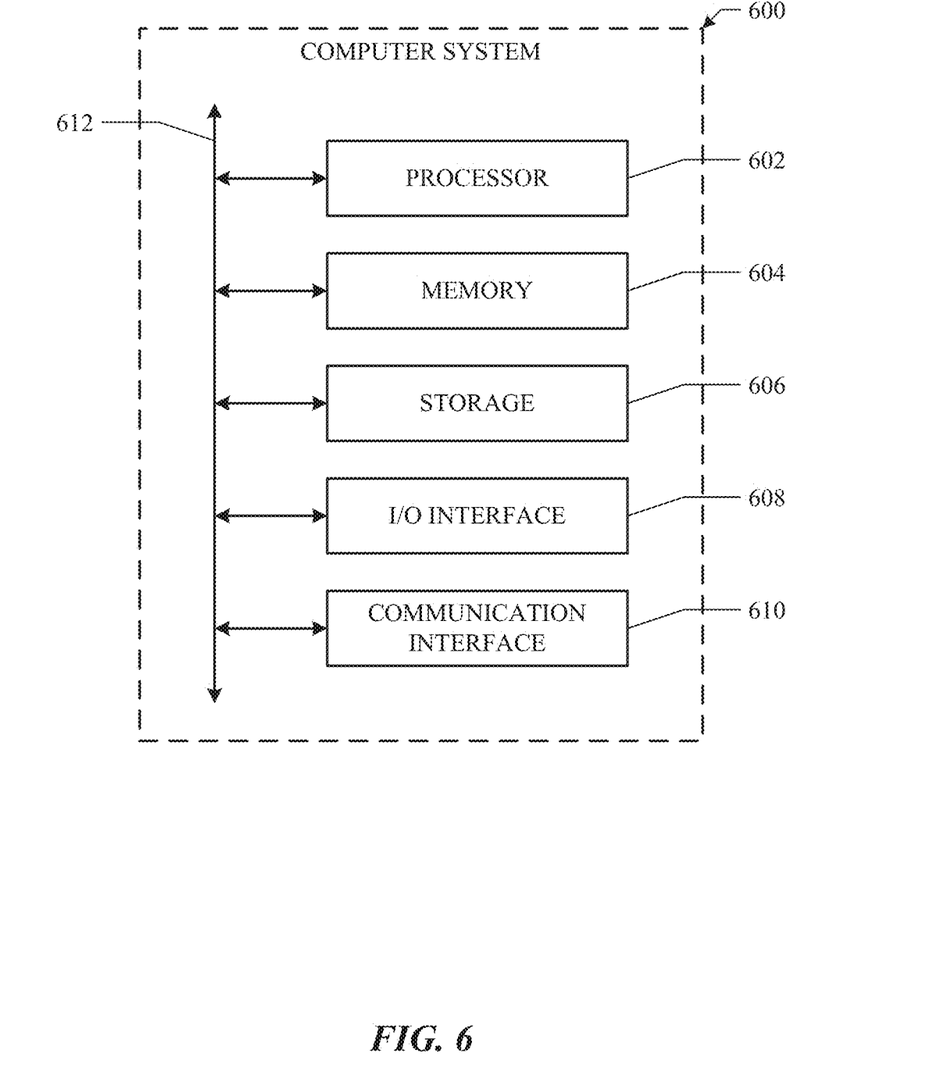
FIG. 6 illustrates an example computer system.

FIG. 6 illustrates an example computer system 600. In particular embodiments, one or more computer systems 600 perform one or more steps of one or more methods described or illustrated herein. In particular embodiments, one or more computer systems 600 provide functionality described or illustrated herein. In particular embodiments, software running on one or more computer systems 600 performs one or more steps of one or more methods described or illustrated herein or provides functionality described or illustrated herein. Particular embodiments include one or more portions of one or more computer systems 600. Herein, reference to a computer system may encompass a computing device, and vice versa, where appropriate. Moreover, reference to a computer system may encompass one or more computer systems, where appropriate.

This disclosure contemplates any suitable number of computer systems 600. This disclosure contemplates computer system 600 taking any suitable physical form. As example and not by way of limitation, computer system 600 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, or a combination of two or more of these. Where appropriate, computer system 600 may include one or more computer systems 600; be unitary or distributed; span multiple locations; span multiple machines; span multiple data centers; or reside in a cloud, which may include one or more cloud components in one or more networks. Where appropriate, one or more computer systems 600 may perform without substantial spatial or temporal limitation one or more steps of one or more methods described or illustrated herein. As an example and not by way of limitation, one or more computer systems 600 may perform in real time or in batch mode one or more steps of one or more methods described or illustrated herein. One or more computer systems 600 may perform at different times or at different locations one or more steps of one or more methods described or illustrated herein, where appropriate.

In particular embodiments, computer system 600 includes a processor 602, memory 604, storage 606, an input/output (I/O) interface 608, a communication interface 610, and a bus 612. Although this disclosure describes and illustrates a particular computer system having a particular number of particular components in a particular arrangement, this disclosure contemplates any suitable computer system having any suitable number of any suitable components in any suitable arrangement.

In particular embodiments, processor 602 includes hardware for executing instructions, such as those making up a computer program. As an example and not by way of limitation, to execute instructions, processor 602 may retrieve (or fetch) the instructions from an internal register, an internal cache, memory 604, or storage 606; decode and execute them; and then write one or more results to an internal register, an internal cache, memory 604, or storage 606. In particular embodiments, processor 602 may include one or more internal caches for data, instructions, or addresses. This disclosure contemplates processor 602 including any suitable number of any suitable internal caches, where appropriate. As an example and not by way of limitation, processor 602 may include one or more instruction caches, one or more data caches, and one or more translation lookaside buffers (TLBs). Instructions in the instruction caches may be copies of instructions in memory 604 or storage 606, and the instruction caches may speed up retrieval of those instructions by processor 602. Data in the data caches may be copies of data in memory 604 or storage 606 for instructions executing at processor 602 to operate on; the results of previous instructions executed at processor 602 for access by subsequent instructions executing at processor 602 or for writing to memory 604 or storage 606; or other suitable data. The data caches may speed up read or write operations by processor 602. The TLBs may speed up virtual-address translation for processor 602. In particular embodiments, processor 602 may include one or more internal registers for data, instructions, or addresses. This disclosure contemplates processor 602 including any suitable number of any suitable internal registers, where appropriate. Where appropriate, processor 602 may include one or more arithmetic logic units (ALUs); be a multi-core processor; or include one or more processors 602. Although this disclosure describes and illustrates a particular processor, this disclosure contemplates any suitable processor.

In particular embodiments, memory 604 includes main memory for storing instructions for processor 602 to execute or data for processor 602 to operate on. As an example and not by way of limitation, computer system 600 may load instructions from storage 606 or another source (such as, for example, another computer system 600) to memory 604. Processor 602 may then load the instructions from memory 604 to an internal register or internal cache. To execute the instructions, processor 602 may retrieve the instructions from the internal register or internal cache and decode them. During or after execution of the instructions, processor 602 may write one or more results (which may be intermediate or final results) to the internal register or internal cache. Processor 602 may then write one or more of those results to memory 604. In particular embodiments, processor 602 executes only instructions in one or more internal registers or internal caches or in memory 604 (as opposed to storage 606 or elsewhere) and operates only on data in one or more internal registers or internal caches or in memory 604 (as opposed to storage 606 or elsewhere). One or more memory buses (which may each include an address bus and a data bus) may couple processor 602 to memory 604. Bus 612 may include one or more memory buses, as described below. In particular embodiments, one or more memory management units (MMUs) reside between processor 602 and memory 604 and facilitate accesses to memory 604 requested by processor 602. In particular embodiments, memory 604 includes random access memory (RAM). This RAM may be volatile memory, where appropriate Where appropriate, this RAM may be dynamic RAM (DRAM) or static RAM (SRAM). Moreover, where appropriate, this RAM may be single-ported or multi-ported RAM. This disclosure contemplates any suitable RAM. Memory 604 may include one or more memories 604, where appropriate. Although this disclosure describes and illustrates particular memory, this disclosure contemplates any suitable memory.

In particular embodiments, storage 606 includes mass storage for data or instructions. As an example and not by way of limitation, storage 606 may include a hard disk drive (HDD), a floppy disk drive, flash memory, an optical disc, a magneto-optical disc, magnetic tape, or a Universal Serial Bus (USB) drive or a combination of two or more of these. Storage 606 may include removable or non-removable (or fixed) media, where appropriate. Storage 606 may be internal or external to computer system 600, where appropriate. In particular embodiments, storage 606 is non-volatile, solid-state memory. In particular embodiments, storage 606 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 606 taking any suitable physical form. Storage 606 may include one or more storage control units facilitating communication between processor 602 and storage 606, where appropriate. Where appropriate, storage 606 may include one or more storages 606. Although this disclosure describes and illustrates particular storage, this disclosure contemplates any suitable storage.

In particular embodiments, I/O interface 608 includes hardware, software, or both, providing one or more interfaces for communication between computer system 600 and one or more I/O devices. Computer system 600 may include one or more of these I/O devices, where appropriate. One or more of these I/O devices may enable communication between a person and computer system 600. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 608 for them. Where appropriate, I/O interface 608 may include one or more device or software drivers enabling processor 602 to drive one or more of these I/O devices. I/O interface 608 may include one or more I/O interfaces 608, where appropriate. Although this disclosure describes and illustrates a particular I/O interface, this disclosure contemplates any suitable I/O interface.

In particular embodiments, communication interface 610 includes hardware, software, or both providing one or more interfaces for communication (such as, for example, packet-based communication) between computer system 600 and one or more other computer systems 600 or one or more networks. As an example and not by way of limitation, communication interface 610 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 610 for it. As an example and not by way of limitation, computer system 600 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 600 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 600 may include any suitable communication interface 610 for any of these networks, where appropriate. Communication interface 610 may include one or more communication interfaces 610, where appropriate. Although this disclosure describes and illustrates a particular communication interface, this disclosure contemplates any suitable communication interface.

In particular embodiments, bus 612 includes hardware, software, or both coupling components of computer system 600 to each other. As an example and not by way of limitation, bus 612 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 612 may include one or more buses 612, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, functions, operations, or steps, any of these embodiments may include any combination or permutation of any of the components, elements, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A method comprising, by a computing device:
   receiving, from a client system of a first user, a first query for one or more objects, the first query comprising a first location;
   identifying a plurality of objects matching the first query, one or more of the identified objects having a location within a first tile of a map comprising a plurality of tiles, the first location being within the first tile, wherein the map is divided into the plurality of tiles such that each tile has an approximately constant object density; and
   generating search results comprising references to a plurality of the identified objects; and
   sending, to the client system of the first user, at least a portion of the first tile for display, wherein the first tile comprises a first threshold number of the search results referencing identified objects having a location within the first tile.

2. The method of claim 1, wherein one or more of the identified objects has a location within a neighboring tile of the first tile.

3. The method of claim 2, wherein the first tile and the neighboring tile have approximately the same object density, and wherein first tile and the neighboring tile have different sizes.

4. The method of claim 2, further comprising sending, to the client system of the first user, at least a portion of the neighboring tile for display.

5. The method of claim 1, wherein one or more of the identified objects has a location within a neighboring tile of the first tile, and wherein the neighboring tile comprises a second threshold number of the search results referencing identified object having a location within the neighboring tile.

6. The method of claim 1, wherein the plurality of tiles comprises tiles of a plurality of sizes.

7. The method of claim 1, further comprising generating the plurality of tiles by:
   accessing the map, the map comprising a plurality of tiles representing a plurality of geographic areas, respectively, wherein each tile comprises a plurality of objects having locations within the tile, and wherein the map is divided into the plurality of tiles such that each tile has an approximately constant object density, each tile having below a threshold number of objects located within the tile;
   generating a first set of tiles at a first level, wherein each tile of the first set of tiles has a first number of objects having locations within the tile; and for each tile in the first set of tiles having a number of objects greater than or equal to the threshold number of objects, generating a second set of tiles at a second level within the tile.

8. The method of claim 1, further comprising generating the plurality of tiles by:
accessing the map, wherein the map comprises N levels of tiles organized in a tree-data structure having a root node corresponding to the map and a plurality of child nodes corresponding to the tiles; and
for each level m of levels 1 to N−1:
for each tile in level m:
calculating the number of objects located within the tile; and
if the number of objects is greater than or equal to a threshold number of objects, then generating a set of tiles at level m+1 with the tile.

9. The method of claim 1, wherein identifying one or more objects corresponding to the first query comprises:
calculating a distance for each object from the first location; and
identifying one or more object having a distance less than a threshold distance from the first location.

10. The method of claim 1, further comprising:
ranking the identified objects;
wherein generating search results comprising references to the plurality of the identified objects comprises generating search results comprising references to one or more of the identified objects having a raking greater than a threshold ranking.

11. The method of claim 1, wherein the first location is received from a geographic-position component of a client system associated with the first user.

12. The method of claim 1, wherein the first location is based on one or more of a global position system (GPS) signal, a Wi-Fi signal, or a cellular radio signal.

13. The method of claim 1, wherein the first location is based on a search history associated with the first user.

14. The method of claim 1, further comprising:
accessing a social graph comprising a plurality of nodes and a plurality of edges connecting the nodes, each of the edges between two of the nodes representing a single degree of separation between them, the nodes comprising:
a first node corresponding to the first user, the first user being associated with an online social network; and
a plurality of second nodes that each correspond to a concept or a second user associated with the online social network, each second node being associated with a second location; and
wherein identifying one or more objects corresponding to the first query comprises identifying one or more second nodes corresponding to the first query.

15. The method of claim 14, wherein identifying one or more second nodes corresponding to the first query comprises:

for each object in the first tile, calculating a degree of separation between the first node and the second node associated with the object; and
identifying one or more objects having a degree of separation less than a threshold degree of separation.

16. The method of claim 1, wherein the portion of the first tile is displayed on a user interface of a native application associated with the online social network on the client system of the first user.

17. The method of claim 1, wherein the portion of the first tile is displayed on a webpage of the online social network accessed by a browser client of the client system of the first user.

18. One or more computer-readable non-transitory storage media embodying software that is operable when executed to:
receive, from a client system of a first user, a first query for one or more objects, the first query comprising a first location;
identify a plurality of objects matching the first query, one or more of the identified objects having a location within a first tile of a map comprising a plurality of tiles, the first location being within the first tile, wherein the map is divided into the plurality of tiles such that each tile has an approximately constant object density; and
generate search results comprising references to a plurality of the identified objects; and
send, to the client system of the first user, at least a portion of the first tile for display, wherein the first tile comprises a first threshold number of the search results referencing identified objects having a location within the first tile.

19. A system comprising: one or more processors; and a memory coupled to the processors comprising instructions executable by the processors, the processors operable when executing the instructions to:
receive, from a client system of a first user, a first query for one or more objects, the first query comprising a first location;
identify a plurality of objects matching the first query, one or more of the identified objects having a location within a first tile of a map comprising a plurality of tiles, the first location being within the first tile, wherein the map is divided into the plurality of tiles such that each tile has an approximately constant object density; and
generate search results comprising references to a plurality of the identified objects; and
send, to the client system of the first user, at least a portion of the first tile for display, wherein the first tile comprises a first threshold number of the search results referencing identified objects having a location within the first tile.

* * * * *